(12) United States Patent
Bauchot et al.

(10) Patent No.: US 7,659,869 B1
(45) Date of Patent: Feb. 9, 2010

(54) SYSTEM AND METHOD FOR AUTHENTICATING AN END USER

(75) Inventors: Frederic Bauchot, Saint-Jeannet (FR); Flemming Boegelund, Frederikssund (DK); Gerard Marmigere, Drap (FR); Sebastian Thomschke, Berlin (DE)

(73) Assignee: Inernational Business Machines Corporation, Armonk, NY (US)

( * ) Notice: Subject to any disclaimer, the term of this patent is extended or adjusted under 35 U.S.C. 154(b) by 0 days.

(21) Appl. No.: 12/329,972

(22) Filed: Dec. 8, 2008

(30) Foreign Application Priority Data

Nov. 21, 2008 (EP) .................................. 08305819

(51) Int. Cl.
*G09G 3/00* (2006.01)
(52) U.S. Cl. ............................................ 345/32; 726/2
(58) Field of Classification Search .................... 345/32, 345/156, 204; 726/2, 5; 705/67; 235/462.01; 340/5.6, 5.65, 5.66
See application file for complete search history.

(56) References Cited

U.S. PATENT DOCUMENTS

| | | | |
|---|---|---|---|
| 5,450,491 | A | 9/1995 | McNair |
| 5,939,699 | A | 8/1999 | Perttunen et al. |
| 7,263,205 | B2 | 8/2007 | Lev |
| 7,266,693 | B1 | 9/2007 | Potter et al. |
| 2005/0140497 | A1 | 6/2005 | Chiviendacz et al. |
| 2006/0015725 | A1 | 1/2006 | Voice et al. |
| 2006/0020559 | A1* | 1/2006 | Steinmetz ................... 705/67 |
| 2006/0031174 | A1* | 2/2006 | Steinmetz ................... 705/67 |
| 2007/0277224 | A1 | 11/2007 | Osborn et al. |
| 2007/0289000 | A1* | 12/2007 | Weiss .......................... 726/5 |

OTHER PUBLICATIONS

Ito et al., "Authentication with 3D Pattern Communication," Electronics and Communications in Japan, Part 1, vol. 87, No. 12, 2004. Obtained from Wiley Periodicals, Inc., pp. 78-89.

QRick Card System. [online] 1 page. [retrieved on May 28, 2008]. Retrieved from the Internet:< URL: http://ubiks.net/local/blog/jmt/archives3/004419.html>.

Help in Connecting to Jyske Netbank. [online] 2 pages—original and English Translation. [retrieved on Sep. 11, 2008]. Retrieved from the Internet:< URL: https://www.jyskedistance.dk/service/_jb/ASP/Apps/NetbankDemo/demo/jb/html/DK/hlplogon1.htm>.

(Continued)

*Primary Examiner*—Ricardo L Osorio
(74) *Attorney, Agent, or Firm*—Schmeiser, Olsen & Watts; William H. Steinberg (57) ABSTRACT

A method for authenticating an end user. The method begins by generating a login field in response to receiving an authentication request from an end user. The login field comprises a login node matrix comprising a first set of transparent and opaque nodes in addition to at least one login offset. Next the method determines an authenticity status of the end user by comparing data received from the end user with said first set of transparent nodes. The data received being sent in response to sending the login field to the end user. The end user generated the data by overlaying a transparent credit card on top of the login field and aligning the login offset with a card offset and then selecting at least one node which is not opaque. Finally, the method sends the determined authenticity status to the end user via an output device.

24 Claims, 5 Drawing Sheets

OTHER PUBLICATIONS

RSA SecurID. [online] 3 pages. [retrieved on Aug. 21, 2008]. Retrieved from the Internet< URL: http://www.rsa.com/node.aspx?id=1156>.

U.S. Appl. No. 12/128,060, filed May 28, 2008; Confirmation No. 9627; Customer No. 30449.

U.S. Appl. No. 12/316,149, filed Dec. 10, 2008; Confirmation No. 9012; Customer No. 30449.

U.S. Appl. No. 12/316,221, filed Dec. 10, 2008; Confirmation No. 1248; Customer No. 30449.

U.S. Appl. No. 11/967,910, filed Dec. 31, 2007; Customer No. 67647.

* cited by examiner

SYSTEM AND METHOD FOR AUTHENTICATING AN END USER

BACKGROUND OF THE INVENTION

The present invention relates to authenticating an end user; more specifically, authenticating an end user by means of dynamic information to prevent fraud.

Conventional authentication methods utilize static information to validate an end user. Since static information by its very nature rarely changes, individuals can easily capture an end user's authentication information for fraudulent use in the future.

Furthermore, conventional authentication methods traditionally employ only 1-way authentication. The term 1-way authentication hereinafter means identifying only a single party to a multiple party transaction. Conventional authentication methods usually call for an end user to authenticate to an entity (e.g. bank, credit card company, government agency, etc.) without the entity authenticating to the end user. The use of 1-way authentication methods exposes an end user to phishing attacks. The term phishing hereinafter means an attempt to criminally and/or fraudulently acquire sensitive information by masquerading as a trustworthy entity in an electronic medium.

SUMMARY OF THE INVENTION

The present invention provides a method for authenticating an end user, said method comprising:

generating a login field in response to receiving an authentication request from said end user, said login field comprising a login node matrix and at least one login offset, said login node matrix comprising a first set of transparent nodes and a first set of opaque nodes, said at least one login offset comprising both random characters and a unique string of characters known only by said end user;

determining an authenticity status of said end user by comparing a subset of nodes received from said end user with said first set of transparent nodes, said subset of nodes being received in response to sending said login field to said end user, said end user having generated said subset of nodes by overlaying a transparent credit card on top of said login field and aligning said login offset with a card offset residing in said transparent credit card and then selecting at least one node which is not opaque; and sending said determined authenticity status to said end user via an output device.

DETAILED DESCRIPTION OF THE DRAWINGS

Definitions

The term 'credit card' as used herein refers to any automated teller machine (ATM) card, credit card, charge card, debit card, gift card, etc. issued by an entity which allows an end user the ability to purchase goods and/or services therewith.

The term 'node' as used herein refers to a single point residing within either a login field and/or a transparent credit card which may be either transparent or opaque.

The term 'transparent node' as used herein refers to a node which allows for a background pattern to be seen through, the background pattern being such a bright pattern to maximize contrast between a dark pattern designated for opaque nodes.

The term 'opaque node' as used herein refers to a node comprising a dark pattern such that a background pattern may not been seen through.

SPECIFICATION

Although certain embodiments of the present invention are described herein, it is understood that modifications may be made to the present invention without departing from its course and scope. Scope of the present invention is not limited to the number of constituting components, the materials thereof, the shapes thereof, the relative arrangement thereof, etc. Furthermore, while the accompanying drawings illustrate certain embodiments of the present invention, such drawings are not necessarily depicted to scale.

Figure 1:
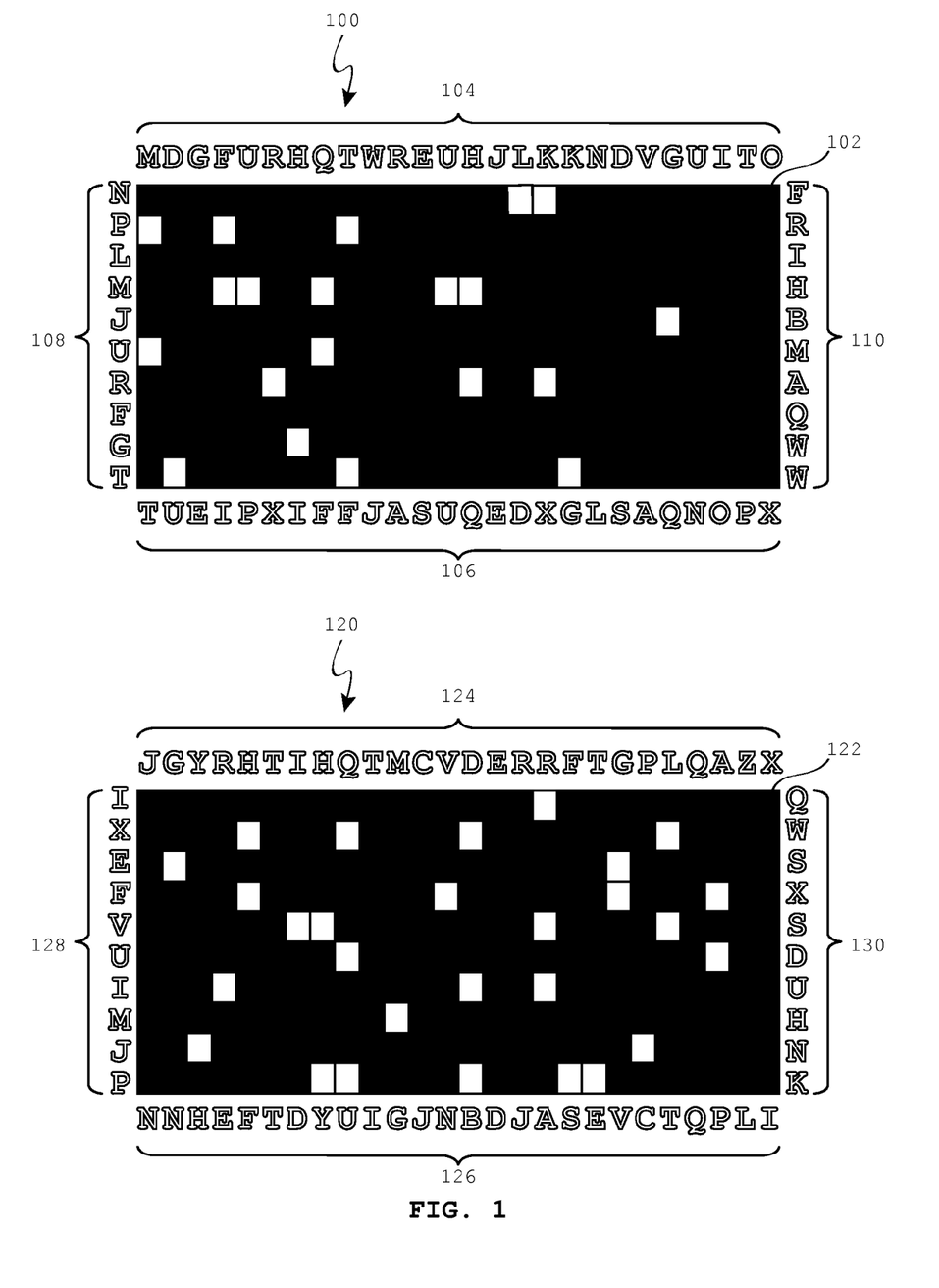
FIG. 1 illustrates a graphical representation of a login field and a transparent credit card used to authenticate an end user, in accordance with embodiments of the present invention.

FIG. 1 illustrates a graphical representation of a login field 100 and a transparent credit card 120 used to authenticate an end user, in accordance with embodiments of the present invention.

The login field 100 comprises a login node matrix 102, a top offset 104, a bottom offset 106, a left offset 108, and a right offset 110. The login node matrix 102 further comprises a subset of nodes collectively called the selected nodes which are transparent. The login node matrix 102 also comprises a subset of nodes collectively called the un-selected nodes which are opaque. The transparent nodes allows for a background pattern to be seen through the transparent nodes, the background pattern being such a bright pattern to maximize contrast between the dark pattern designated for the opaque nodes.

The top offset 104, bottom offset 106, left offset 108, and right offset 110 further comprise what appear to be randomly selected characters. The offsets 104 through 110 are used to align the transparent credit card 120 over the login field 100 and attempt an authentication. In one embodiment of the present invention, the login field 100 comprises one offset selected from the offsets 104 through 110.

In an alternative embodiment of the present invention, the login field 100 comprises two offsets randomly selected from the offsets 104 through 110. In another alternative embodiment of the present invention, the login field 100 comprises three offsets randomly selected from the offsets 104 through 110.

Regardless of the embodiment, the transparent nodes and the opaque nodes are dynamically selected for each authentication attempt made by an end user. The characters residing in each of the offsets 104 through 110 are likewise dynamically selected for each authentication attempt made by an end user.

The transparent credit card 120 comprises a card node matrix 122, a top offset 124, a bottom offset 126, a left offset 128, and a right offset 130. The card node matrix 122 further comprises a subset of nodes collectively called the selected nodes which are transparent. The card node matrix 122 also comprises a subset of nodes collectively called the un-selected nodes which are opaque. The transparent nodes allows for a background pattern to be seen through the transparent nodes, the background pattern being such a bright pattern to maximize contrast between the dark pattern designated for the opaque nodes.

The top offset 124, bottom offset 126, left offset 128, and right offset 130 further comprise what appear to an end user to be randomly selected characters. The offsets 124 through 130 are used by an end user to align the transparent credit card 120 over the login field 100. In one embodiment of the present invention, the transparent credit card 120 comprises one offset selected from the offsets 124 through 130.

In an alternative embodiment of the present invention, the transparent credit card 120 comprises two offsets randomly selected from the offsets 124 through 130. In another alternative embodiment of the present invention, the transparent credit card 120 comprises three offsets randomly selected from the offsets 124 through 130.

In contrast to the login field 100, the transparent and the opaque nodes residing in the card node matrix 122 are statically selected by the credit card provider. The characters residing in each of the offsets 124 through 130 are likewise statically selected by the credit card provider before the first authentication attempt is made.

Moreover, the login field 100 and the transparent credit card 120 contain some unique geometrical characteristics. The login node matrix 102 residing in the login field 100 has either more rows and/or more columns than the card node matrix 122 residing in the transparent credit card 120. The larger login node matrix 102 in the login field 100 allows for more combinations of overlaying the transparent credit card 120 onto the login field 100.

Also worth noting is the fact that each offset 104 through 110 comprises a different random selection of characters when compared to each offset 124 through 130.

For instance, the top offset 104 residing in the login field 100 does not match the offset 124 in the transparent credit card 120. However, upon closer inspection both top offsets 104 and 124 contain the character string 'HQT'. Similarly, the bottom offsets 106 and 126 both contain the character string 'JAS'. An end user to align the transparent credit card 120 over the login field 100 uses these examples of similar patterns.

Authentication is facilitated by the end user identifying a string of characters which appear in any one of the offsets 124 through 130 residing in the transparent credit card 120. Only the end user and the transparent credit card provider know the string of characters. When the end user overlays the transparent credit card 120 on top of the login field 100 and aligns the secret string of characters, the proper nodes will appear which the end user selects to attempt authentication.

Figure 2:
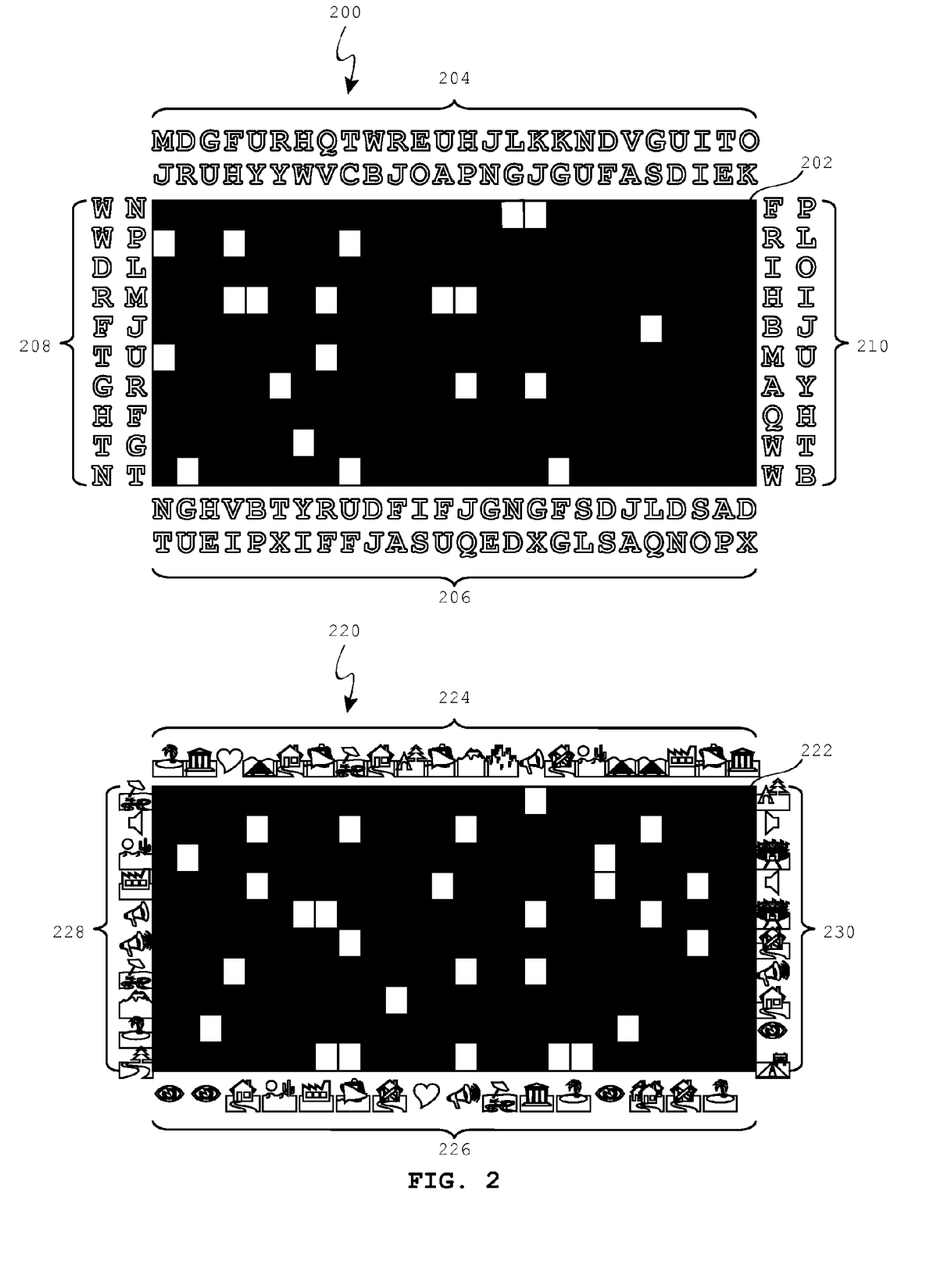
FIG. 2 illustrates a graphical representation of an alternative login field and transparent credit card used to authenticate an end user, in accordance with embodiments of the present invention.

FIG. 2 illustrates a graphical representation of an alternative login field 200 and/or transparent credit card 220 used to authenticate an end user, in accordance with embodiments of the present invention.

The alternative login field 200 comprises a login node matrix 202, a top offset 204, a bottom offset 206, a left offset 208, and a right offset 210. However, the offsets 204 through 210 residing in the login field 200 comprise two rows of seemingly random characters.

In one embodiment of the present invention, each row of characters in a given offset 204 through 210 is different from each other. In another embodiment of the present invention, the two rows of characters in a given offset 204 through 210 are identical. In yet another alternative embodiment of the present invention, each offset 204 through 210 residing in the login field 200 may contain three rows of seemingly random characters. If the login field 200 is implemented, a transparent credit card would be required to comprise the two row offsets (top, bottom, left, right) as well.

The alternative transparent credit card 220 comprises a card node matrix 222, a top offset 224, a bottom offset 226, a left offset 228, and a right offset 230. However, note the offsets 224 through 230 residing in the transparent credit card 220 comprise rows of seemingly random images. If the transparent credit card 220 is implemented, a login field would be required which comprises offsets containing random images as well.

Figure 3:
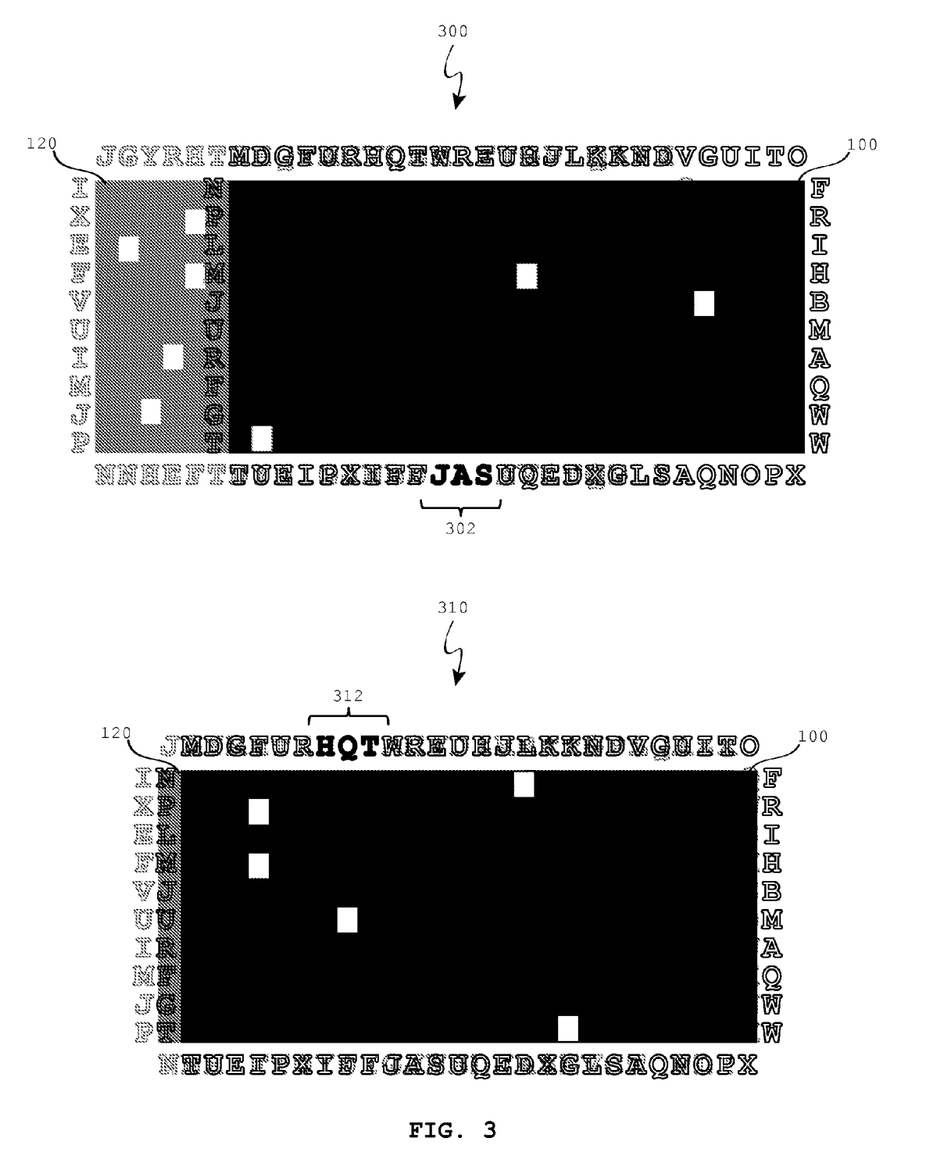
FIG. 3 illustrates a graphical representation of the combination of transparent credit card and login field, in accordance with embodiments of the present invention.

FIG. 3 illustrates a graphical representation of the combination of transparent credit card 120 and login field 100, in accordance with embodiments of the present invention.

The example 300 illustrates the transparent credit card 120 overlaid on top of the login field 100. More specifically, the transparent credit card 120 is aligned with respect to the bottom offset and the character string 'JAS' 302. As identified with respect to FIG. 1, both the transparent credit card 120 and the login field 100 contain the character string 'JAS' 302 in their bottom offsets 106 and 126. Therefore, example 300 demonstrates the result of overlaying the transparent credit card 120 on top of the login field 100; the appearance of three nodes.

Both the transparent credit card 120 and the login field 100 share the three transparent nodes appearing in the example 300. If the character string known only to the end user and transparent credit card provider is 'JAS' then when the end user selects the three transparent nodes the authentication attempt would be successful. However, if the secret character string is 'HQT' (see example 310, infra) and not 'JAS', the login attempt selecting the three nodes present in the example 300 would fail.

Example 310 illustrates an alternative overlay of the transparent credit card 120 on top of the login field 100. More specifically, the transparent credit card 120 is aligned with respect to the top offset and the character string 'HQT' 312. As identified with respect to FIG. 1, both the transparent credit card 120 and the login field 100 contain the character string 'HQT' 312 in their top offsets 104 and 124. Therefore, example 310 demonstrates the result of overlaying the transparent credit card 120 on top of the login field 100; the appearance of five nodes.

Both the transparent credit card 120 and the login field 100 share the five transparent nodes appearing in the example 310. If the character string known only to the end user and transparent credit card provider is 'HQT' then when the end user selects the five transparent nodes the authentication attempt would be successful. However, if the secret character string is 'JAS' (see example 300, supra) and not 'JAS', the login attempt selecting the three nodes present in the example 300 would fail.

In one embodiment of the present invention, when the login field 100 is created in response to an authentication attempt, the offsets comprise multiple strings which match characters in the end user's transparent credit card 120. The reason for the multiple strings is so that an unauthorized user may not obtain a transparent credit card 120 and easily decipher which string is unique to the specific transparent credit card 120.

Figure 4:
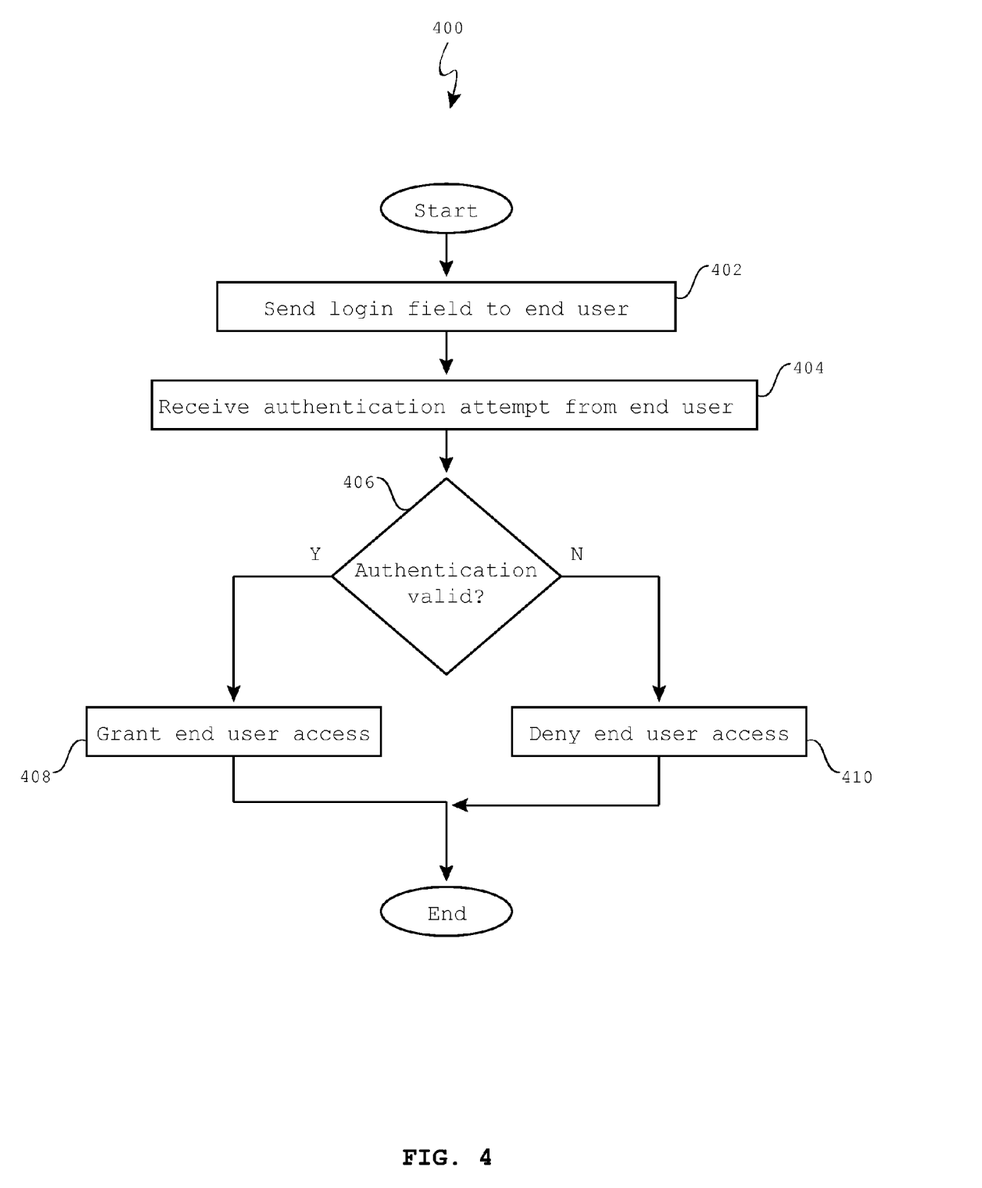
FIG. 4 illustrates a method for authenticating an end user, in accordance with embodiments of the present invention.

FIG. 4 illustrates a method 400 for authenticating an end user, in accordance with embodiments of the present invention.

The method 400 begins with step 402 which comprises sending a login field to an end user. The login field is sent to the end user in response to the end user initiating an authentication attempt. In one embodiment of the present invention, the initiation comprises receipt of the end user's userID.

The userID uniquely identifies the end user which requested access to the secure information. Step 402 would then identify the unique card node matrix corresponding to the end user attempting the authentication. Additionally, step 402 would identify the offsets corresponding to the end user's card node matrix.

Based on the card node matrix and offsets, step 402 would dynamically create a login node matrix and offsets which if used properly would authenticate the end user. Contained within the login field's offsets generated pursuant to step 402 are multiple character strings matching the offsets of the transparent credit card belonging to the end user. Each character string combination, if used by the end user, would highlight different sets of nodes contained within the login node matrix. Therefore, the login field and transparent credit card may be used properly in one situation: where the end user attempting authentication aligns the transparent credit card with the secret string in the login offsets known only to the end user and the provider of the transparent credit card.

Step 402 finally sends the login node matrix and offsets, as a complete login field, to the end user. The login field may be sent to the end user by means of an output device 910 (see FIG. 5, infra).

After completion of step 402, the method 400 continues with step 404 which comprises receiving an authentication attempt by the end user. In one embodiment of the present invention, the end user facilitates the selection of the authentication data by utilizing the transparent credit card 120 (see FIG. 1, supra). The end user overlays the transparent credit card 120 onto the login field 100 provide pursuant to step 402 and aligns the offsets containing the secret string of characters; thus generating the combination 300/310 of FIG. 3, supra. In one embodiment of the present invention the end user then selects the transparent nodes contained in the combination 300/310 for submission as the authentication data.

After completion of step 404, the method 400 continues with step 406 which comprises determining whether the end user's authentication attempt is valid. Step 406 compares the nodes selected in the authentication data received pursuant to step 404 with the login node matrix sent pursuant to step 402.

If the authentication data contains only those nodes which were transparent if the end user overlaid their transparent credit card over the login field and aligned the string within one offset known only to the end user and the transparent credit card provider, step 406 returns a response 'yes' and the method 400 continues with step 408 which comprises granting the end user access to secure information.

In one embodiment of the present invention, the step 406 returns a response 'no' and the method 400 denies the end user access 410 if the authentication data received pursuant to step 404 contains at least one node which would not be transparent if the end user overlaid their transparent credit card onto the login field and aligned the offsets with the secret string.

In an alternative embodiment of the present invention, step 406 returns a response 'no' and the method 400 denies the end user access 410 if the authentication data received pursuant to step 404 does not contain all the nodes which would be transparent if the end user overlaid their transparent credit card onto the login field and aligned the offsets with the secret string. The difference with this embodiment is that the end user may select incorrect nodes, so long as the authentication data contains the proper nodes as well. This may account for an errant node selection by the end user.

Step 408 comprises granting the end user access to secure information. After completion of step 408, the method 400 ends.

Step 410 comprises denying the end user who attempted to authenticate access to the secure information. In one embodiment of the present invention, after completion of step 410, the method ends. In an alternative embodiment of the present invention, after completion of step 410, the method returns to step 402 and sends a subsequent login field to the end user to attempt an authentication again.

Figure 5:
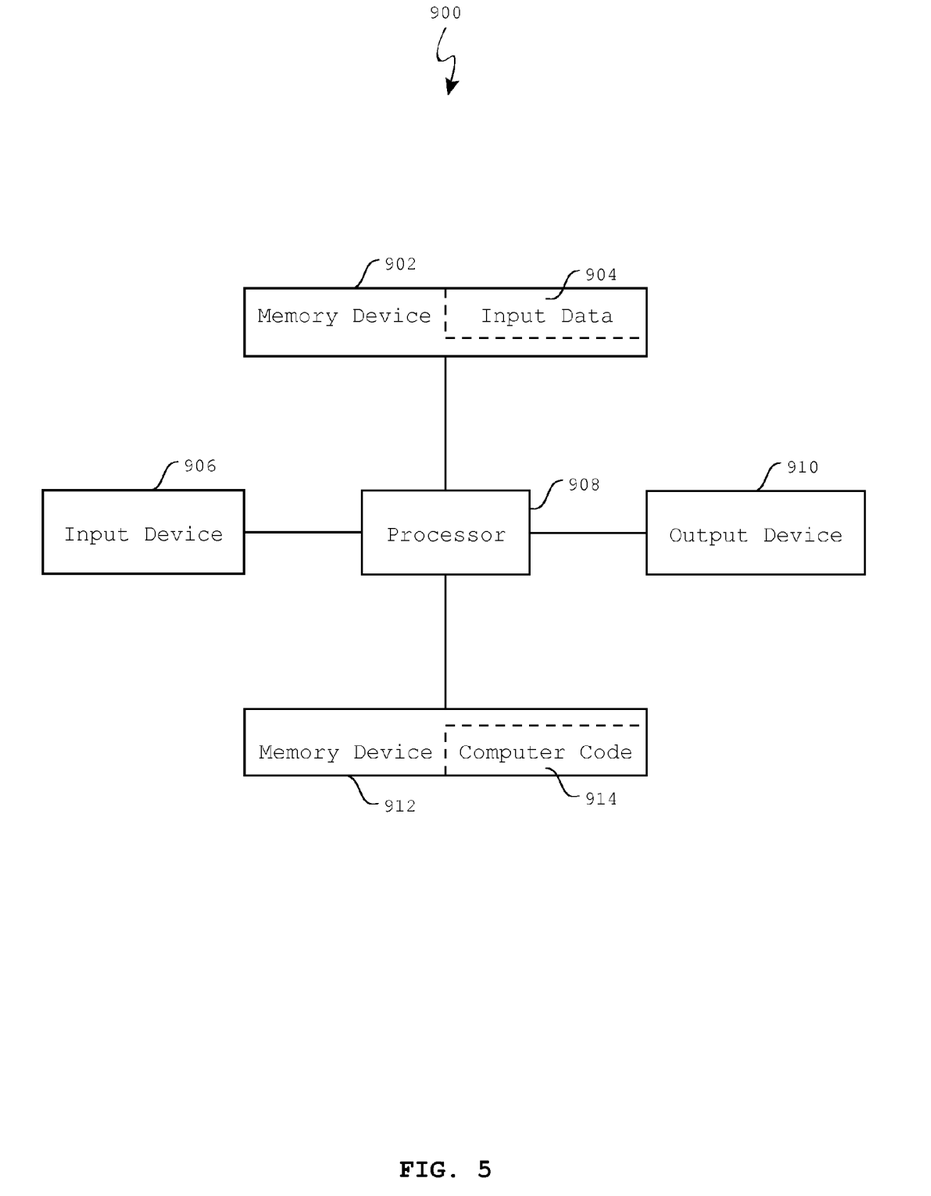
FIG. 5 illustrates a computer system which may facilitate a method for authenticating and end user, in accordance with embodiments of the present invention.

FIG. 5 illustrates a computer system 900 which may facilitate a method for authenticating an end user, in accordance with embodiments of the present invention.

The computer system 900 comprises a processor 908, an input device 906 coupled to the processor 908, an output device 910 coupled to the processor 908, and memory devices 902 and 912 each coupled to the processor 908.

The input device 906 may be, inter alia, a keyboard, a mouse, a keypad, a touchscreen, a voice recognition device, a sensor, a network interface card (NIC), a Voice/video over Internet Protocol (VoIP) adapter, a wireless adapter, a telephone adapter, a dedicated circuit adapter, etc.

The output device 910 may be, inter alia, a printer, a plotter, a computer screen, a magnetic tape, a removable hard disk, a floppy disk, a NIC, a VoIP adapter, a wireless adapter, a telephone adapter, a dedicated circuit adapter, an audio and/or visual signal generator, a light emitting diode (LED), etc.

The memory devices 902 and 912 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 912 includes a computer code 914 which is a computer program that comprises computer-executable instructions.

The computer code 914 includes, inter alia, an algorithm used for authenticating and end user according to the present invention. The processor 908 executes the computer code 914. The memory device 902 includes input data 904. The input data 904 includes input required by the computer code 914. The output device 910 displays output from the computer code 914. Either or both memory devices 902 and 912 (or one or more additional memory devices not shown in FIG. 5) may be used as a computer usable medium (or a computer readable medium or a program storage device) having a computer readable program embodied therein and/or having other data stored therein, wherein the computer readable program comprises the computer code 914. Generally, a computer program product (or, alternatively, an article of manufacture) of the computer system 900 may comprise said computer usable medium (or said program storage device).

Any of the components of the present invention can be deployed, managed, serviced, etc. by a service provider that offers to deploy or integrate computing infrastructure with respect to a process for authenticating and end user. Thus, the present invention discloses a process for supporting computer infrastructure, comprising integrating, hosting, maintaining and deploying computer-readable code into a computing system (e.g., computing system 900), wherein the code in combination with the computing system is capable of performing a method for authenticating and end user.

In another embodiment, the invention provides a business method that performs the process steps of the invention on a subscription, advertising and/or fee basis. That is, a service provider, such as a Solution Integrator, can offer to create, maintain, support, etc. a process for authenticating an end user. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 5 shows the computer system 900 as a particular configuration of hardware and software, any configuration of hardware and software, as would be known to a person of ordinary skill in the art, may be utilized for the purposes stated supra in conjunction with the particular computer system 900 of FIG. 5. For example, the memory devices 902 and 912 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed:

1. A method for authenticating an end user, said method comprising:
   generating a login field in response to receiving an authentication request from said end user, said login field comprising a login node matrix and at least one login offset, said login node matrix comprising a first set of transparent nodes and a first set of opaque nodes, said at least one login offset comprising both random characters and a unique string of characters known only by said end user;
   determining an authenticity status of said end user by comparing a subset of nodes received from said end user with said first set of transparent nodes, said subset of nodes being received in response to sending said login field to said end user, said end user having generated said subset of nodes by overlaying a transparent credit card on top of said login field and aligning said login offset with a card offset residing in said transparent credit card and then selecting at least one node which is not opaque; and
   sending said determined authenticity status to said end user via an output device.

2. The method of claim 1, said transparent credit card comprising:
   a card node matrix and at least one said card offset, said card node matrix comprising a second set of transparent nodes and a second set of opaque nodes, said at least one card offset comprising both random characters and said unique string of characters known only to said end user.

3. The method of claim 1, said determining said authenticity status comprising:
   determining that said end user is authentic by determining that each node in said subset of nodes corresponds to a unique node in said first set of transparent nodes which could only be selected if said end user overlaid said transparent credit card on top of said login field in such a way as to align said unique string of characters in said login offset with said unique string of characters in said card offset; and
   approving said authentication request from said end user in response to having determined that said end user is authentic.

4. The method of claim 1, said determining said authenticity status comprising:
   determining that said end user is not authentic by determining that each node in said subset of nodes does not correspond to a unique node in said first set of transparent nodes which could only be selected if said end user overlaid said transparent credit card on top of said login field in such a way as to align said unique string of characters in said login offset with said unique string of characters in said card offset; and
   denying said authentication request from said end user in response to having determined that said end user is not authentic.

5. The method of claim 1, in which pursuant to said overlaying said transparent credit card on top of said login field, where a transparent node residing in said login field is overlaid by a transparent node residing in said transparent credit card then a resulting transparent node is displayed.

6. The method of claim 1, in which pursuant to said overlaying said transparent credit card on top of said login field, where a transparent node residing in said login field is overlaid by an opaque node residing in said transparent credit card or an opaque node residing in said login field is overlaid by a transparent node residing in said transparent credit card or an opaque node residing in said login field is overlaid by an opaque node residing in said transparent credit card, then a resulting opaque node is displayed.

7. A computer program product, comprising a computer-usable storage medium having a computer-readable program code stored therein, said computer-readable program code containing instructions that when executed by a processor of a computer system implement a method for authenticating an end user, said method comprising:
   generating a login field in response to receiving an authentication request from said end user, said login field comprising a login node matrix and at least one login offset, said login node matrix comprising a first set of transparent nodes and a first set of opaque nodes, said at least one login offset comprising both random characters and a unique string of characters known only by said end user;
   determining an authenticity status of said end user by comparing a subset of nodes received from said end user with said first set of transparent nodes, said subset of nodes being received in response to sending said login field to said end user, said end user having generated said subset of nodes by overlaying a transparent credit card on top of said login field and aligning said login offset with a card offset residing in said transparent credit card and then selecting at least one node which is not opaque; and
   sending said determined authenticity status to said end user via an output device.

8. The computer program product of claim 7, said transparent credit card comprising:
   a card node matrix and at least one said card offset, said card node matrix comprising a second set of transparent nodes and a second set of opaque nodes, said at least one card offset comprising both random characters and said unique string of characters known only to said end user.

9. The computer program product of claim 7, said determining said authenticity status comprising:
   determining that said end user is authentic by determining that each node in said subset of nodes corresponds to a unique node in said first set of transparent nodes which could only be selected if said end user overlaid said transparent credit card on top of said login field in such a way as to align said unique string of characters in said login offset with said unique string of characters in said card offset; and
   approving said authentication request from said end user in response to having determined that said end user is authentic.

10. The computer program product of claim 7, said determining said authenticity status comprising:
  determining that said end user is not authentic by determining that each node in said subset of nodes does not correspond to a unique node in said first set of transparent nodes which could only be selected if said end user overlaid said transparent credit card on top of said login field in such a way as to align said unique string of characters in said login offset with said unique string of characters in said card offset; and
  denying said authentication request from said end user in response to having determined that said end user is not authentic.

11. The computer program product of claim 7, in which pursuant to said overlaying said transparent credit card on top of said login field, where a transparent node residing in said login field is overlaid by a transparent node residing in said transparent credit card then a resulting transparent node is displayed.

12. The computer program product of claim 7, in which pursuant to said overlaying said transparent credit card on top of said login field, where a transparent node residing in said login field is overlaid by an opaque node residing in said transparent credit card or an opaque node residing in said login field is overlaid by a transparent node residing in said transparent credit card or an opaque node residing in said login field is overlaid by an opaque node residing in said transparent credit card, then a resulting opaque node is displayed.

13. A computing system comprising a processor coupled to a computer-readable memory unit, said memory unit comprising a software application, said software application comprising instruction that when executed by said processor, implement a method for authenticating an end user, said method comprising:
  generating a login field in response to receiving an authentication request from said end user, said login field comprising a login node matrix and at least one login offset, said login node matrix comprising a first set of transparent nodes and a first set of opaque nodes, said at least one login offset comprising both random characters and a unique string of characters known only by said end user;
  determining an authenticity status of said end user by comparing a subset of nodes received from said end user with said first set of transparent nodes, said subset of nodes being received in response to sending said login field to said end user, said end user having generated said subset of nodes by overlaying a transparent credit card on top of said login field and aligning said login offset with a card offset residing in said transparent credit card and then selecting at least one node which is not opaque; and
  sending said determined authenticity status to said end user via an output device.

14. The computing system of claim 13, said transparent credit card comprising:
  a card node matrix and at least one said card offset, said card node matrix comprising a second set of transparent nodes and a second set of opaque nodes, said at least one card offset comprising both random characters and said unique string of characters known only to said end user.

15. The computing system of claim 13, said determining said authenticity status comprising:
  determining that said end user is authentic by determining that each node in said subset of nodes corresponds to a unique node in said first set of transparent nodes which could only be selected if said end user overlaid said transparent credit card on top of said login field in such a way as to align said unique string of characters in said login offset with said unique string of characters in said card offset; and
  approving said authentication request from said end user in response to having determined that said end user is authentic.

16. The computing system of claim 13, said determining said authenticity status comprising:
  determining that said end user is not authentic by determining that each node in said subset of nodes does not correspond to a unique node in said first set of transparent nodes which could only be selected if said end user overlaid said transparent credit card on top of said login field in such a way as to align said unique string of characters in said login offset with said unique string of characters in said card offset; and
  denying said authentication request from said end user in response to having determined that said end user is not authentic.

17. The computing system of claim 13, in which pursuant to said overlaying said transparent credit card on top of said login field, where a transparent node residing in said login field is overlaid by a transparent node residing in said transparent credit card then a resulting transparent node is displayed.

18. The computing system of claim 13, in which pursuant to said overlaying said transparent credit card on top of said login field, where a transparent node residing in said login field is overlaid by an opaque node residing in said transparent credit card or an opaque node residing in said login field is overlaid by a transparent node residing in said transparent credit card or an opaque node residing in said login field is overlaid by an opaque node residing in said transparent credit card, then a resulting opaque node is displayed.

19. A process for supporting computer infrastructure, said process comprising providing at least one support service for at least one of creating, integrating, hosting, maintaining, and deploying computer-readable code in a computing system, wherein said code in combination with the computing system is capable of implementing a method for authenticating an end user, said method comprising:
  generating a login field in response to receiving an authentication request from said end user, said login field comprising a login node matrix and at least one login offset, said login node matrix comprising a first set of transparent nodes and a first set of opaque nodes, said at least one login offset comprising both random characters and a unique string of characters known only by said end user;
  determining an authenticity status of said end user by comparing a subset of nodes received from said end user with said first set of transparent nodes, said subset of nodes being received in response to sending said login field to said end user, said end user having generated said subset of nodes by overlaying a transparent credit card on top of said login field and aligning said login offset with a card offset residing in said transparent credit card and then selecting at least one node which is not opaque; and
  sending said determined authenticity status to said end user via an output device.

20. The process for supporting computer infrastructure of claim 19, said transparent credit card comprising:
  a card node matrix and at least one said card offset, said card node matrix comprising a second set of transparent nodes and a second set of opaque nodes, said at least one card offset comprising both random characters and said unique string of characters known only to said end user.

21. The process for supporting computer infrastructure of claim 19, said determining said authenticity status comprising:
- determining that said end user is authentic by determining that each node in said subset of nodes corresponds to a unique node in said first set of transparent nodes which could only be selected if said end user overlaid said transparent credit card on top of said login field in such a way as to align said unique string of characters in said login offset with said unique string of characters in said card offset; and
- approving said authentication request from said end user in response to having determined that said end user is authentic.

22. The process for supporting computer infrastructure of claim 19, said determining said authenticity status comprising:
- determining that said end user is not authentic by determining that each node in said subset of nodes does not correspond to a unique node in said first set of transparent nodes which could only be selected if said end user overlaid said transparent credit card on top of said login field in such a way as to align said unique string of characters in said login offset with said unique string of characters in said card offset; and
- denying said authentication request from said end user in response to having determined that said end user is not authentic.

23. The process for supporting computer infrastructure of claim 19, in which pursuant to said overlaying said transparent credit card on top of said login field, where a transparent node residing in said login field is overlaid by a transparent node residing in said transparent credit card then a resulting transparent node is displayed.

24. The process for supporting computer infrastructure of claim 19, in which pursuant to said overlaying said transparent credit card on top of said login field, where a transparent node residing in said login field is overlaid by an opaque node residing in said transparent credit card or an opaque node residing in said login field is overlaid by a transparent node residing in said transparent credit card or an opaque node residing in said login field is overlaid by an opaque node residing in said transparent credit card, then a resulting opaque node is displayed.

* * * * *